United States Patent
Pang et al.

(10) Patent No.: US 12,317,244 B2
(45) Date of Patent: May 27, 2025

(54) WIRELESS SPECTRUM MANAGEMENT METHOD AND SYSTEM FOR DUCTED ALL-AIR SYSTEM

(71) Applicant: YISUO (Guangdong) Intelligent Technology Co., Ltd, Foshan (CN)

(72) Inventors: Shaoming Pang, Foshan (CN); Wenqi Tian, Foshan (CN)

(73) Assignee: Yiso (Guangdong) Smart Technology Co., Ltd, Foshan (CN)

( * ) Notice: Subject to any disclaimer, the term of this patent is extended or adjusted under 35 U.S.C. 154(b) by 0 days.

(21) Appl. No.: 18/791,343

(22) Filed: Jul. 31, 2024

(65) Prior Publication Data

US 2024/0397500 A1  Nov. 28, 2024

(30) Foreign Application Priority Data

Nov. 29, 2023 (CN) .......................... 202311624613.8

(51) Int. Cl.
*H04W 72/0453* (2023.01)
*H04W 4/38* (2018.01)
*H04W 88/16* (2009.01)

(52) U.S. Cl.
CPC ......... *H04W 72/0453* (2013.01); *H04W 4/38* (2018.02); *H04W 88/16* (2013.01)

(58) Field of Classification Search
CPC ... H04W 72/0453; H04W 4/38; H04W 84/18; H04W 48/18; H04W 88/16; Y04S 20/20; Y04S 20/00; Y04S 20/14; F24F 11/30; F24F 11/46; F24F 11/62; F24F 11/00; F24F 2140/60; H04L 67/10; H04L 67/12
See application file for complete search history.

(56) References Cited

U.S. PATENT DOCUMENTS

| | | | | |
|---|---|---|---|---|
| 9,459,018 | B2* | 10/2016 | Fadell | G05B 15/02 |
| 9,606,552 | B2* | 3/2017 | Stefanski | G01K 1/028 |
| 10,299,096 | B2* | 5/2019 | Ludlow | H04L 12/2838 |
| 11,902,874 | B2* | 2/2024 | Deixler | H04L 41/0823 |
| 12,039,426 | B2* | 7/2024 | Cella | H04B 17/26 |
| 12,041,513 | B2* | 7/2024 | Deixler | H04W 4/029 |
| 12,079,701 | B2* | 9/2024 | Cella | G06N 3/084 |
| 2018/0035305 | A1* | 2/2018 | Hui | H04B 17/26 |
| 2021/0360608 | A1 | 11/2021 | Chakraborty et al. | |

FOREIGN PATENT DOCUMENTS

| | | |
|---|---|---|
| CN | 110290506 A | 9/2019 |
| CN | 111031504 A | 4/2020 |
| CN | 113259892 A | 8/2021 |
| CN | 114585052 A | 6/2022 |

* cited by examiner

*Primary Examiner* — Brian T O Connor

(57) ABSTRACT

A wireless spectrum management method for a ducted all-air system is provided. A gateway waits for a first network access request. An edge data processor sends the first network access request to the gateway, and a local radio of the gateway receives the first network access request and judges whether the edge data processor that sends the first network access request has a network authorization. After the network authorization is confirmed, information fed back by the gateway is sent to the edge data processor. After the edge data processor obtains the information, the local radio of the edge data processor is switched to a first local channel to wait for data service. A remote radio of the edge data processor is switched to a first remote channel to wait for data service. The data service transmission is performed. A wireless spectrum management system is further provided.

8 Claims, 4 Drawing Sheets

WIRELESS SPECTRUM MANAGEMENT METHOD AND SYSTEM FOR DUCTED ALL-AIR SYSTEM

CROSS-REFERENCE TO RELATED APPLICATIONS

This application claims the benefit of priority from Chinese Patent Application No. 202311624613.8, filed on Nov. 29, 2023. The content of the aforementioned application, including any intervening amendments thereto, is incorporated herein by reference in its entirety.

TECHNICAL FIELD

This application relates to wireless communication, and more particularly to a wireless spectrum management method and system for a ducted all-air system.

BACKGROUND

Traditional air duct unit generally includes an outdoor unit, an indoor unit, dampers, thermostats, and a set of air quality management devices. Individual units are generally independent of each other due to different supplier, and thus Input/Output (IO) ports are necessary in the signal transmission there between to complete the system control. This control method cannot realize the information sharing between devices, thus hindering the improvement of energy efficiency and user experience. Moreover, a preset number of power supply and control lines have been pre-buried according to traditional wiring standards at the early stage of construction, and there are no spare lines to provide wired data communication channels. Traditional WIFI and mobile network technologies have major deficiencies in the whole-house signal coverage, such as no signal in the basement and high spectrum rates.

SUMMARY

An object of this application is to provide a wireless spectrum management method and system for a ducted all-air system to realize information sharing among individual parts of the ducted all-air system and data uploading to the cloud platform.

Technical solutions of this application are described as follows.

This application provides a wireless spectrum management method for a ducted all-air system, comprising:
(a) operating a local radio of a gateway in one of a plurality of first control channels, and switching the local radio of the gateway between the plurality of first control channels to wait for a first network access request;
(b) operating a local radio of an edge data processor in one of a plurality of second control channels, and switching the local radio of the edge data processor between the plurality of second control channels; and sending, by the edge data processor, the first network access request to the gateway every time the local radio of the edge data processor is switched between the plurality of second control channels;
(c) determining whether the edge data processor request has a first network authorization when the local radio of the gateway receives the first network access request; and after confirming that the edge data processor has the first network authorization, assigning, by the gateway, a first communication address, a first remote channel, and a first local channel to the edge data processor;
(d) switching the local radio of the edge data processor to the first local channel to wait for a first data service when the local radio of the edge data processor receives the first communication address, the first remote channel, and the first local channel; and switching a remote radio of the edge data processor to the first remote channel to wait for a second data service;
(e) performing data service transmission between a remote radio of the gateway and the remote radio of the edge data processor;
(f) allowing the local radio of the gateway to wait for a second network access request;
(g) performing a local radio of a device data collector in one of a plurality of third control channels, and switching the local radio of the device data collector between the plurality of third control channels; and sending, by the device data collector, the second network access request to the gateway every time the local radio of the device data collector is switched between the plurality of third control channels;
(h) determining whether the device data collector has a second network authorization when the local radio of the gateway receives the second network access request; and after confirming that the device data collector has the second network authorization, assigning, by the gateway, a second communication address and a second local channel to the device data collector;
(i) switching the local radio of the device data collector to the second local channel to wait for a third data service when the local radio of the device data collector receives the second communication address and the second local channel; and
(j) performing data service transmission between the local radio of the edge data processor and the local radio of the device data collector.

In an embodiment, when the edge data processor sends the first network access request, the first network access request comprises a unique identifier of the edge data processor; and after the local radio of the gateway receives the first network access request, the unique identifier of the edge data processor is compared with a database to determine whether the unique identifier of the edge data processor has validity, if yes, proceed to a next step; otherwise, an error signal is fed back, and the gateway is allowed to wait for another first network access request.

In an embodiment, when the edge data processor sends the first network access request, a switching speed of the local radio of the edge data processor between the plurality of second control channels is greater than a switching speed of the local radio of the gateway between the plurality of first control channels.

In an embodiment, when the device data collector sends the second network access request, a switching speed of the local radio of the device data collector between the plurality of third control channels is greater than a switching speed of the local radio of the gateway between the plurality of first control channels.

In an embodiment, when the device data collector sends the second network access request, the second network access request comprises a unique identifier of the device data collector; after the local radio of the gateway receives the second network access request, the unique identifier of the device data collector is compared with a database to determine whether the unique identifier of the device data collector has validity, and if yes, proceed to a next step; otherwise, an error signal is fed back, and the gateway is allowed to wait for another second network access request.

In an embodiment, a communication frame between the gateway and the edge data processor and a communication frame between the gateway and the device data collector both comprise a subnet address and a device address; the subnet address is obtained by the gateway from a cloud platform, wherein the cloud platform is configured to configure the subnet address for a communication device according to a geographic location of the communication device; and the geographic location of the communication device is allocated by the gateway.

In an embodiment, in the event of a failure of the edge data processor, according to a signal intensity and a signal-to-noise ratio of date frame of the second network access request, the gateway selects the device data collector with an optimal signal intensity and an optimal signal-to-noise ratio as a new edge data processor.

This application further provides a wireless spectrum management system for a ducted all-air system, comprising:
a gateway;
a plurality of edge data processors; and
a plurality of device data collectors;
wherein the number of the gateway is one; the gateway is in communication connection with the plurality of edge data processors; and each of the plurality of edge data processors is in communication connection with the plurality of device data collectors;
the plurality of device data collectors are configured to adopt different frequencies for internal data interaction; each of the plurality of edge data processors and the plurality of device data collectors are configured to form an air duct unit; and the plurality of edge data processor are configured to unifiedly process cloud data services; and
the wireless spectrum management system is configured to perform the following steps to implement wireless spectrum management:
performing a local radio of the gateway in one of a plurality of first control channels, and switching the local radio of the gateway between the plurality of first control channels to wait for a first network access request;
performing a local radio of the plurality of edge data processors in a plurality of second control channels, switching the local radio of the plurality of edge data processors between the plurality of second control channels, and sending the first network access request to the gateway every time the local radio of the plurality of edge data processors is switched between the plurality of second control channels;
determining whether one of the plurality of edge data processors that sends the first network access request has a first network authorization when the local radio of the gateway receives the first network access request; and assigning, by the gateway, a first communication address, a first remote channel, and a first local channel to the one of the plurality of edge data processors after confirming that the one of the plurality of edge data processors has the first network authorization;
switching the local radio of the plurality of edge data processors to the first local channel to wait for a first data service when the local radio of the plurality of edge data processors receives the first communication address, the first remote channel, and the first local channel; and switching a remote radio of the plurality of edge data processors to the first remote channel to wait for a second data service;
performing data service transmission between a remote radio of the gateway and the remote radio of the plurality of edge data processors, and allowing the local radio of the gateway to wait for a second network access request;
performing local radio of the plurality of device data collectors in a plurality of third control channels, switching the local radio of the plurality of device data collectors between the plurality of third control channels, and sending the second network access request to the gateway every time the local radio of the plurality of device data collectors is switched between the plurality of third control channels;
determining whether one of the plurality of device data collectors that sends the second network access request has a second network authorization when the local radio of the gateway receives the second network access request; and assigning, by the gateway, a second communication address and a second local channel to the one of the plurality of device data collectors after confirming the one of the plurality of device data collectors has the second network authorization;
switching the local radio of the plurality of device data collectors to the second local channel to wait for a third data service when the local radio of the plurality of device data collectors receives the second communication address and the second local channel; and
performing data service transmission between the local radio of the plurality of edge data processors and the local radio of the plurality of device data collectors.

In an embodiment, the air duct unit further comprises an indoor unit, a thermostat, a damper, and an outdoor unit; the indoor unit is in communication connection with one of the plurality of edge data processors; and the thermostat, the damper and the outdoor unit are in communication connection with a corresponding one of the plurality of device data collectors.

The present application has the following beneficial effects.

This application uses the gateway and the edge data processor as a dual-center architecture and makes full use of local area spectrum resources. Areas where devices of the same air duct unit are located are close, and the data services are exchanged internally. The data services of the same duct unit are processed by the edge data processor and reported to the cloud platform by the gateway, which can effectively reduce the data throughput and improve the communication efficiency.

DETAILED DESCRIPTION OF EMBODIMENTS

The technical solutions of the present disclosure will be further described below in conjunction with the accompanying drawings and embodiments.

Embodiments of the present disclosure are described in detail below with reference to the accompanying drawings. It should be noted that the same or similar reference signs and letters indicate the same or similar elements or elements having the same or similar functions. The embodiments described herein are only used to illustrate and explain this disclosure, which are not intended to limit the disclosure.

As used herein, the term "a plurality of" refers to two or more.

Figure 1:
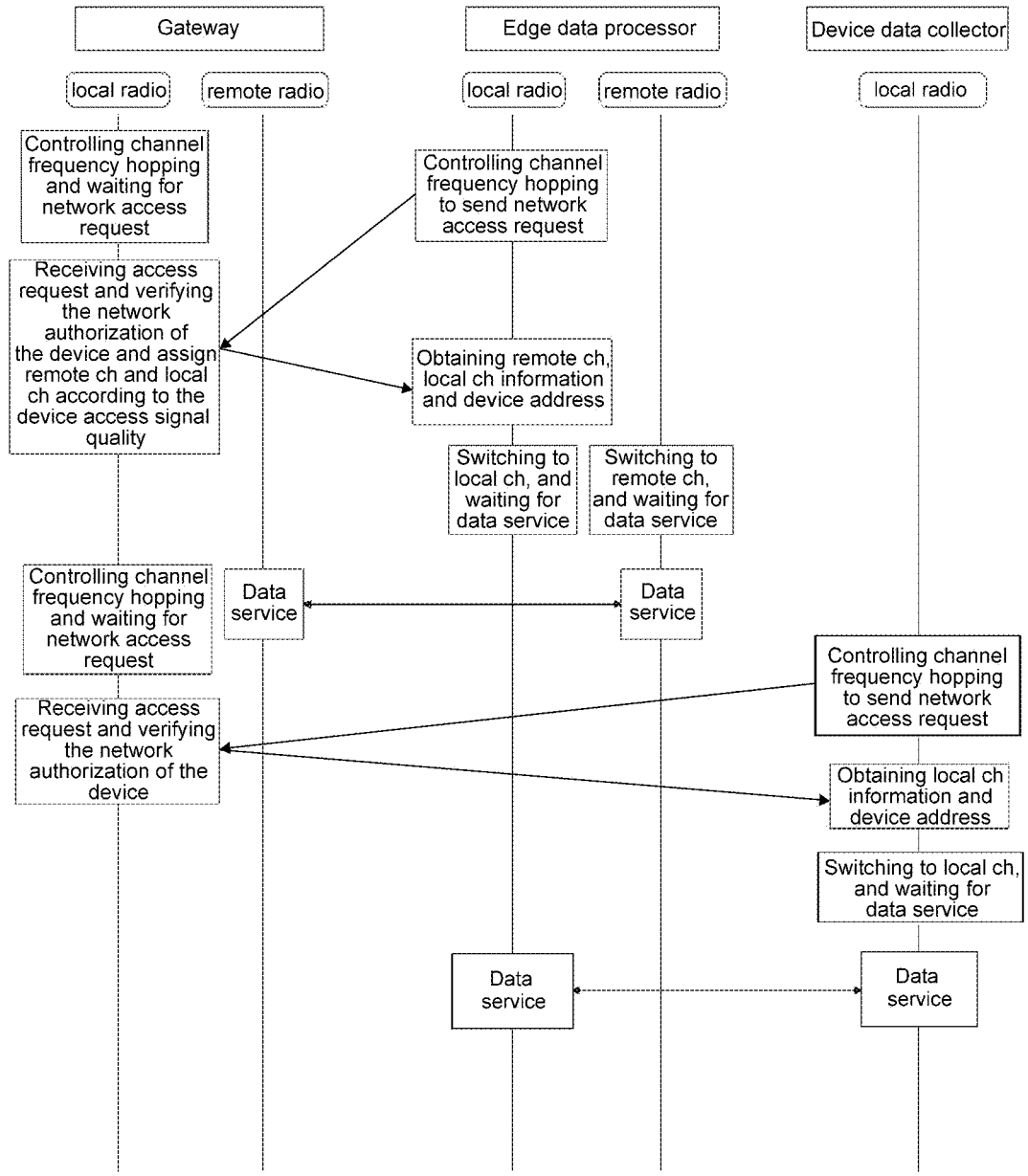
FIG. 1 is a flow chart of a wireless spectrum management method according to an embodiment of the present disclosure.
Figure 2:
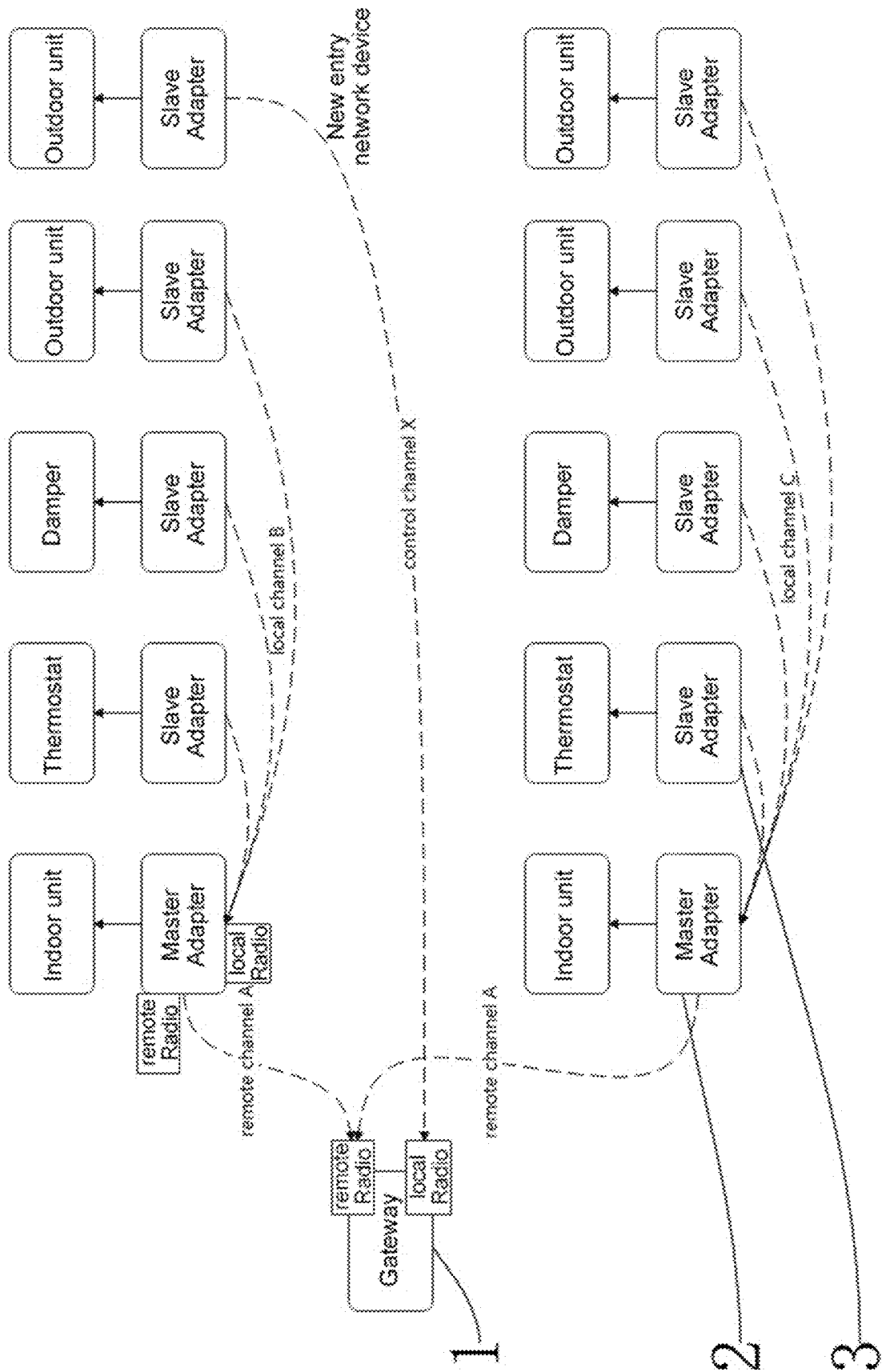
FIG. 2 is a connection diagram of a wireless spectrum management system according to an embodiment of the present disclosure.
Figure 3:
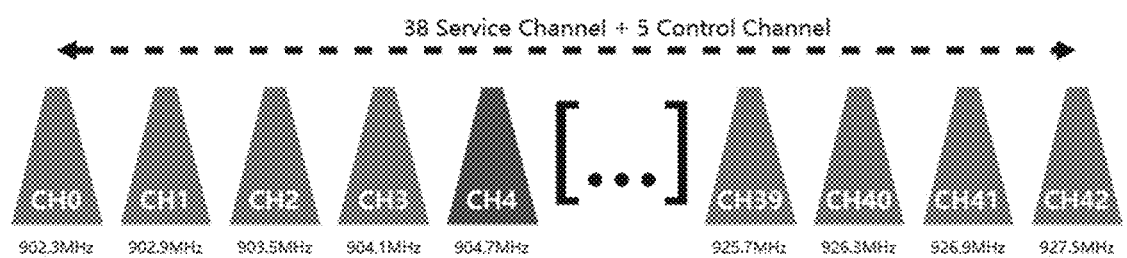
FIG. 3 is a schematic diagram of a channel distribution, a control channel and a service channel according to an embodiment of the present disclosure.
Figure 4:
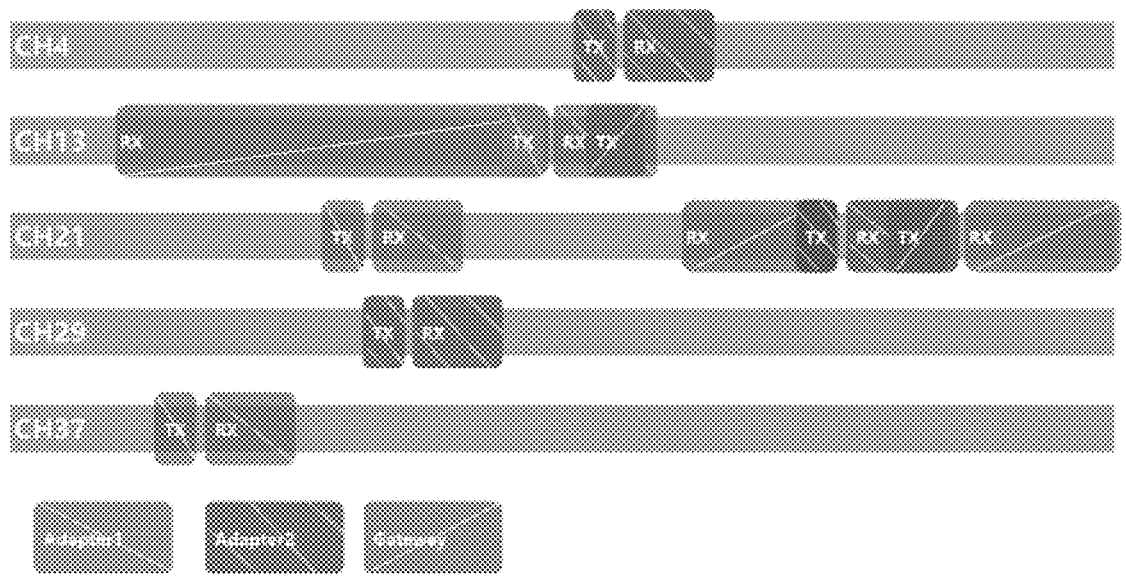
FIG. 4 is a flow diagram of controlling the access of a channel into a network. In the drawings: 1, gateway; 2, edge data processor; and 3, device data collector.

Referring to FIGS. 1-4, a wireless spectrum management method for a ducted all-air system is shown, including the following steps.

A local radio of a gateway is operated in one of a plurality of first control channels and switches between a plurality of first control channels to wait for a first network access request.

A local radio of an edge data processor is operated in one of a plurality of second control channels and switched between a plurality of second control channels. The edge data processor sends a first network access request to the gateway every time the local radio of the edge data processor is switched between the plurality of second control channels.

When the local radio of the gateway receives the first network access request, the gateway determines whether the edge data processor that sends the first network access request has a first network authorization. After confirming that the edge data processor has a first network authorization, the gateway assigns a first communication address, a first remote channel, and a first local channel to the edge data processor.

When the local radio of the edge data processor receives the first communication address, the first remote channel, and the first local channel, the local radio of the edge data processor is switched to the first local channel to wait for a first data service. A remote radio of the edge data processor is switched to the first remote channel to wait for a second data service.

The data service transmission is performed between the remote radio of the gateway and the remote radio of the edge data processor.

The local radio of the gateway waits for a second network access request.

The local radio of the device data collector is performed in one of a plurality of third control channels and switched between a plurality of third control channels. The device data collector sends the second network access request the gateway every time the local radio of the device data collector is switched between a plurality of third control channels.

The local radio of the gateway receives the second network access request and determines whether the device data collector that sends the second network access request has a second network authorization. After confirming that the device data collector has the second network authorization, the gateway assigns a second communication address and a second local channel to the device data collector.

When the local radio of the device data collector receives the second communication address and the second local channel, the local radio of the device data collector is switched to the second local channel and waits for the third data service.

The data service transmission is performed between the local radio of the edge data processor and the local radio of the device data collector.

The gateway (Gateway 1) includes local radio and remote radio.

The edge data processor (Master Adapter 2) also includes local radio and remote radio.

The device data collector (Slave Adapter 3) includes only local radio.

The local radio of the edge data processor receives the first remote channel and the first local channel from the local radio of the gateway. Then, the remote radio of the edge data processor communicates with the remote radio of the gateway over the first remote channel.

The local radio of the device data collector receives the second local channel only from the local radio of the gateway, and then the local radio of the device data collector communicates with the local radio of the edge data processor.

The local radio of the gateway always operates frequency hopping on the control channel; and the remote radio of the gateway operates fixed frequency on the remote channel.

When the edge data processor enters the network phase, the local radio first operates frequency hopping on the second control channel; and after accessing the gateway, the local radio enters the normal service phase, the local radio operates fixed frequency on the first local channel, and the remote radio operates fixed frequency on the first remote channel.

The local radio of the device data collector first operates frequency hopping on a third control channel, and after accessing the gateway to enter the normal service phase, the local radio of the device data collector is frequency-fixed to work on the second local channel.

In the disclosure, an effective section of communication spectrum is selected to be divided into a plurality of channels, which are divided into the first control channel, the second control channel, the third control channel, and the service channel. The service channel includes the first remote channel, the first local channel, and the second local channel. The control channel is used for device access to the network. The service channel is used for service data communication between devices. Both the control channel and the service channel are distributed in the entire communication spectrum band. When the control channel performs frequency modulation to access to the gateway, the gateway evaluates the network access request and then allocates the appropriate communication spectrum as a service channel to communicate with the corresponding edge data processor or device data collector.

The disclosure uses the gateway and the edge data processor as a dual-center architecture and makes full use of local area spectrum resources. Areas where devices of the same air duct unit are located are close, and the data services are exchanged internally. The data services of the same duct unit are processed by the edge data processor and reported to the cloud platform by the gateway, which can effectively reduce the data throughput and improve the communication efficiency.

When the edge data processor sends the first network access request, the first network access request includes a unique identifier of the edge data processor. After the local radio of the gateway receives the first network access request, the unique identifier of the edge data processor is compared with a database to determine whether the unique identifier of the edge data processor has validity, if yes, proceed to a next step; otherwise, an error signal is fed back, and the gateway is allowed to wait for another first network access request.

When the edge data processor sends the first network access request, a switching speed of the local radio of the edge data processor between the plurality of second control channels is greater than the switching speed of the local radio of the gateway between the plurality of first control channels.

At the stage when the edge data processor sends the first network access request, the frequency hopping speed of the gateway is smaller than that of the edge data processor, confirming that the edge data processor can operate at the same frequency as the gateway for a certain period. By frequency hopping for the network access request, the gateway and the edge data processor can communicate in the full frequency range and select the optimal frequency range for the subsequent fixed-frequency service communication.

When the device data collector sends the second network access request, a switching speed of the local radio of the device data collector between the plurality of third control channels is greater than the switching speed of the local radio of the gateway between the plurality of first control channels.

When the device data collector sends the second network access request, the second network access request comprises a unique identifier of the device data collector. After the local radio of the gateway receives the second network access request, the unique identifier of the device data collector is compared with a database to determine whether the unique identifier of the device data collector has validity, and if yes, proceed to a next step; otherwise, an error signal is fed back, and the gateway is allowed to wait for another second network access request.

At the stage when the device data collector sends the second network access request, the frequency hopping speed of the gateway is slower than that of the device data collector to ensure that the device data collector can work at the same frequency with the gateway within a certain period. By frequency hopping for network access request, the gateway and the device data collector can communicate in the full frequency range and select to the optimal frequency range for the subsequent fixed-frequency service communication.

The local radio of the edge data processor operates on a plurality of second control channels and performs fast random switching on the second control channels during the phase of the device network access request. The local radio of the device data collector operates on a plurality of third control channels and performs fast random switching on the third control channels during the phase of the device network access request.

For each new control channel switched by the edge data processor or the device data collector, the corresponding edge data processor or the device data collector sends a frame of the network access request to the gateway, which contains a unique identifier of the device. If the gateway receives the network access request on the current first control channel and confirms that the unique identifier of the device has validity, response to the network access request for corresponding to a communication address information, a remote channel and a local channel of the network access request device.

The remote channel and the local channel are selected from the service channels. In the case of sufficient communication spectrum resources, different duct units will be assigned with different local channels, and the edge data processor (Master Adapter) communicating with the same gateway will be assigned with the same remote channel. The gateway can predict the communication effect of the peripheral service channels based on the signal quality obtained from the control channel and select the appropriate service channel to assign to the local radio of the edge data processor to obtain better communication quality. The spectrum allocation of the remote channel of each edge processor needs to be performed based on the signal quality of the access request command received by the gateway in the control channel to optimize the effect of the environment on the antenna.

Specifically, the communication frame between the gateway and the edge data processor and the communication frame between the gateway and the device data collector both further include a subnet address and a device address. The subnet address is obtained by the gateway from the cloud platform. The geographical location of a communication device is allocated by the gateway.

The cloud platform is configured to configure the subnet address for the communication device according to the geographical location of the communication device, so as to avoid the duplication of subnet addresses in the neighboring communication systems under the condition of limited subnet addresses.

By combining the management of subnet addresses of each network and the management of geographic locations of the communication device under the same duct unit, the cloud platform can maximize the address coding efficiency and achieve the data differentiation of different devices in the case of spectrum public use with a minimum number of address bits.

Under the same gateway, different geographic locations of the communication device are independently assigned by the gateway to ensure that different communication devices under the same duct unit have different locations. This mechanism can make the communication address as short as possible and effectively avoid device address duplication in the wireless signal overlapping area of different air duct units, resulting in information confusion.

In the disclosure, the channel access method adopts the Time Division Multiple Access (TDMA) access method, and the upstream and downstream channels adopt the opposite in-phase quadrature (IQ) modulation method, so as to avoid that the device in the upstream channel listens to other upstream communications and wastes the processor arithmetic resources. The device transmits data in the upstream channel using random delay and listen before transmitting. The random delay uses a multi-level mechanism to cope with different Quality of Service (Qos) requirements. The high-level delay range [a, b] and the low-level delay range [c, d], which ensures that a<c, i.e., the random delay for data with high Qos demand is shorter than that for data with low Qos demand, in order to ensure that the high Qos has a higher priority for transmission. At the same time, b and d can be reduced as the number of transmissions retries increases, which has ensured the real-time data demand.

Through the graded dynamically adjusted random delay access method, differentiated data communication services can be provided for different Qos requirements, ensuring critical data transmission priority while guaranteeing basic data communication real-time.

When the edge data processor fails, the gateway selects the device data collector with the optimal signal intensity and the optimal signal-to-noise ratio as the new edge data processor based on the signal intensity and signal-to-noise ratio of the network access request sent by the device data collector.

The disclosure adopts a dynamic configuration of the edge data processor device, due to differences in the location and surrounding scene of the equipment installation, the communication effect between the devices within the same duct unit and the gateway varies, and the devices in each duct unit can be configured with a number of data processors and other hardware devices. According to the signal intensity and signal-to-noise ratio of the network access request frame of each data processor, the gateway dynamically specifies the data processor with the best signal intensity and signal-to-noise ratio as the edge data processor of the air duct unit, thereby confirming the reliability of the entire communication system and the cloud data communication.

The dynamic edge data processor configuration can optimize the wireless communication effect between the air duct system and the gateway, and at the same time provide a fault weakening capability, so that when the edge data processor is abnormal, the device data collector that has the hardware of the edge data processor can be adjusted to be the edge data processor, so as to ensure that the communication system can continue to operate stably.

A wireless spectrum management system for a ducted all-air system includes a gateway 1, a plurality of edge data processors 2, and a plurality of device data collectors 3.

The number of the gateway 1 is one.

The gateway 1 is in communication connection with a plurality of the edge data processors 2.

Each of plurality of edge data processor 2 is in communication connection with a plurality of the device data collectors 3. A plurality of the device data collectors 3 adopts different frequencies for internal data interaction. Each of the plurality of edge data processors 2 and the plurality of device data collectors 3 are configured to form an air duct unit. A plurality of edge data processor 2 are configured to unifiedly process the cloud data services.

In this embodiment, the air duct unit includes the indoor unit, the thermostat, the damper, and the outdoor unit. The indoor unit is in communication connection with one of the plurality of edge data processors 2. The thermostat, the damper, and the outdoor unit are in communication connection with a corresponding one of the plurality of device data collectors 3 respectively.

The system adopts a two-tier central architecture, where one tier is a gateway 1—centred architecture, and one tier is an edge data processor 2—centred architecture. Within one building unit, one gateway 1 is used as one tier architecture to communicate all data services that need to upload the cloud with the cloud platform. The edge data processor 2 is set up as another tier architecture in each duct unit of the building unit. Other equipment within the same duct unit communicates with the edge data processor 2 through the device data collector 3. The information exchange within the same duct unit is realized through the edge data processor 2, and the data to be uploaded to the cloud is relayed to the gateway 1 through the edge data processor 2 and then transmitted to the cloud platform. The edge data processor 2 aggregates and integrates the relevant data of the corresponding duct unit, and then uploads the data services that need to be reported to the cloud platform through the gateway 1, and shares the data services that need to be shared locally among each device data collector 3. The locally shared data services are shared in the local channels, and the data services to be uploaded to the cloud are sent to the gateway 1 through the remote channel and then uploaded to the cloud platform, making full use of the spectrum wireless LAN resources. The device data collector 3 is used as an access unit for local data services.

As used herein, the term "embodiment" and the like mean that the specific features, structures, materials or characteristics described are included in at least one embodiment of the disclosure. In this specification, schematic expressions of the above terms do not necessarily refer to the same embodiment. Moreover, the specific features, structures, materials, or characteristics described may be combined in any one or more embodiments in a suitable manner.

The technical principles of the present disclosure are described above in connection with embodiments. These descriptions are merely intended to explain the principles of the disclosure and are not intended to limit the present disclosure. For those skilled in the art, other embodiments obtained based on these embodiments without paying creative efforts should fall within the scope of the disclosure defined by the appended claims.

What is claimed is:

1. A wireless spectrum management method for a ducted all-air system, comprising:
    (a) operating a local radio of a gateway in one of a plurality of first control channels, and switching the local radio of the gateway between the plurality of first control channels to wait for a first network access request;
    (b) operating a local radio of an edge data processor in one of a plurality of second control channels, and switching the local radio of the edge data processor between the plurality of second control channels; and sending, by the edge data processor, the first network access request to the gateway every time the local radio of the edge data processor is switched between the plurality of second control channels;
    (c) determining whether the edge data processor has a first network authorization when the local radio of the gateway receives the first network access request; and after confirming that the edge data processor has the first network authorization, assigning, by the gateway, a first communication address, a first remote channel, and a first local channel to the edge data processor;
    (d) switching the local radio of the edge data processor to the first local channel to wait for a first data service when the local radio of the edge data processor receives the first communication address, the first remote channel, and the first local channel; and switching a remote radio of the edge data processor to the first remote channel to wait for a second data service;
    (e) performing data service transmission between a remote radio of the gateway and the remote radio of the edge data processor;
    (f) allowing the local radio of the gateway to wait for a second network access request;
    (g) operating a local radio of a device data collector in one of a plurality of third control channels, and switching the local radio of the device data collector between the plurality of third control channels; and sending, by the device data collector, the second network access request to the gateway every time the local radio of the device data collector is switched between the plurality of third control channels;
    (h) determining whether the device data collector has a second network authorization when the local radio of the gateway receives the second network access request; and after confirming that the device data collector has the second network authorization, assigning, by the gateway, a second communication address and a second local channel to the device data collector;

(i) switching the local radio of the device data collector to the second local channel to wait for a third data service when the local radio of the device data collector receives the second communication address and the second local channel; and (j) performing data service transmission between the local radio of the edge data processor and the local radio of the device data collector.

2. The wireless spectrum management method of claim 1, wherein when the edge data processor sends the first network access request, the first network access request comprises a unique identifier of the edge data processor; and after the local radio of the gateway receives the first network access request, the unique identifier of the edge data processor is compared with a database to determine whether the unique identifier of the edge data processor has validity, if yes, proceed to a next step; otherwise, an error signal is fed back, and the gateway is allowed to wait for another first network access request.

3. The wireless spectrum management method of claim 2, wherein when the edge data processor sends the first network access request, a switching speed of the local radio of the edge data processor between the plurality of second control channels is greater than a switching speed of the local radio of the gateway between the plurality of first control channels.

4. The wireless spectrum management method of claim 1, wherein when the device data collector sends the second network access request, a switching speed of the local radio of the device data collector between the plurality of third control channels is greater than a switching speed of the local radio of the gateway between the plurality of first control channels.

5. The wireless spectrum management method of claim 4, wherein when the device data collector sends the second network access request, the second network access request comprises a unique identifier of the device data collector; after the local radio of the gateway receives the second network access request, the unique identifier of the device data collector is compared with a database to determine whether the unique identifier of the device data collector has validity, and if yes, proceed to a next step; otherwise, an error signal is fed back, and the gateway is allowed to wait for another second network access request.

6. The wireless spectrum management method of claim 1, wherein a communication frame between the gateway and the edge data processor and a communication frame between the gateway and the device data collector both comprise a subnet address and a device address; the subnet address is obtained by the gateway from a cloud platform, wherein the cloud platform is configured to configure the subnet address for a communication device according to a geographic location of the communication device; and the geographic location of the communication device is allocated by the gateway.

7. The wireless spectrum management method of claim 1, wherein in the event of a failure of the edge data processor, according to a signal intensity and a signal-to-noise ratio of date frame of the second network access request, the gateway selects the device data collector with an optimal signal intensity and an optimal signal-to-noise ratio as a new edge data processor.

8. A wireless spectrum management system for a ducted all-air system, comprising:
a gateway;
a plurality of edge data processors; and
a plurality of device data collectors;
wherein the number of the gateway is one; the gateway is in communication connection with the plurality of edge data processors; and each of the plurality of edge data processors is in communication connection with the plurality of device data collectors;
the plurality of device data collectors are configured to adopt different frequencies for internal data interaction; and the plurality of edge data processors are configured to process cloud data services; and
the wireless spectrum management system is configured to perform the following steps to implement wireless spectrum management:
operating a local radio of the gateway in a plurality of first control channels, and switching the local radio of the gateway between the plurality of first control channels to wait for a first network access request;
operating a local radio of the plurality of edge data processors in a plurality of second control channels, switching the local radio of the plurality of edge data processors between the plurality of second control channels, and sending the first network access request to the gateway every time the local radio of the plurality of edge data processors is switched between the plurality of second control channels;
determining whether one of the plurality of edge data processors that sends the first network access request has a first network authorization when the local radio of the gateway receives the first network access request; and assigning, by the gateway, a first communication address, a first remote channel, and a first local channel to the one of the plurality of edge data processors after confirming that the one of the plurality of edge data processors has the first network authorization;
switching the local radio of the plurality of edge data processors to the first local channel to wait for a first data service when the local radio of the plurality of edge data processors receives the first communication address, the first remote channel, and the first local channel; and switching a remote radio of the plurality of edge data processors to the first remote channel to wait for a second data service;
performing data service transmission between a remote radio of the gateway and the remote radio of the plurality of edge data processors, and allowing the local radio of the gateway to wait for a second network access request;
performing local radio of the plurality of device data collectors in a plurality of third control channels, switching the local radio of the plurality of device data collectors between the plurality of third control channels, and sending the second network access request to the gateway every time the local radio of the plurality of device data collectors is switched between the plurality of third control channels;
determining whether one of the plurality of device data collectors that sends the second network access request has a second network authorization when the local radio of the gateway receives the second network access request; and assigning, by the gateway, a second communication address and a second local channel to the one of the plurality of device data collectors after confirming the one of the plurality of device data collectors has the second network authorization;
switching the local radio of the plurality of device data collectors to the second local channel to wait for a third data service when the local radio of the plurality of device data collectors receives the second communication address and the second local channel; and performing data service transmission between the local radio of the plurality of edge data processors and the local radio of the plurality of device data collectors.

\* \* \* \* \*